(12) United States Patent
Bartolacelli et al.

(10) Patent No.: US 6,886,802 B2
(45) Date of Patent: May 3, 2005

(54) ELECTROMAGNETICALLY-ACTUATED TWO-WAY VALVE

(75) Inventors: Marco Bartolacelli, Modena (IT); Sergio Acerbi, Medolla (IT); Reggiani Claudio, Modena (IT)

(73) Assignee: EDI System S.p.A., Milan (IT)

( * ) Notice: Subject to any disclaimer, the term of this patent is extended or adjusted under 35 U.S.C. 154(b) by 150 days.

(21) Appl. No.: 10/450,674

(22) PCT Filed: Sep. 4, 2001

(86) PCT No.: PCT/IT01/00456

§ 371 (c)(1),
(2), (4) Date: Jun. 17, 2003

(87) PCT Pub. No.: WO02/50462

PCT Pub. Date: Jun. 27, 2002

(65) Prior Publication Data

US 2004/0051068 A1 Mar. 18, 2004

(30) Foreign Application Priority Data

Dec. 21, 2000 (IT) .................................. MO2000A0283

(51) Int. Cl.[7] .............................................. F16K 31/40
(52) U.S. Cl. .............................. 251/129.19; 251/129.15
(58) Field of Search ........... 251/129.15, 129.19–129.21

(56) References Cited

U.S. PATENT DOCUMENTS

| | | | | |
|---|---|---|---|---|
| 2,968,464 A | | 1/1961 | Olson | |
| 3,970,282 A | * | 7/1976 | Hansen | 251/129.07 |
| 4,592,533 A | | 6/1986 | Guglielmi et al. | |
| 5,174,544 A | * | 12/1992 | Emanie | 251/30.01 |
| 6,766,820 B1 | * | 7/2004 | Hoss | 137/66 |

FOREIGN PATENT DOCUMENTS

EP  0 565 292 A1  10/1993

* cited by examiner

*Primary Examiner*—J. Casimer Jacyna
(74) *Attorney, Agent, or Firm*—Young & Thompson

(57) ABSTRACT

An electromagnetically-actuated two-way two-position valve is normally closed and comprises an axially-mobile group (5) which has an upper end (5a) that faces a fixed group (6) and which is attracted thereby. An obturator (4) is intercepted and then drawn in an opening movement by the mobile group (5) when the mobile group (5) is at a short distance from an end of its run. A return spring (9), which displaced the obturator (4) towards a closed position when the fixed group is deactivated, is entirely located behind the upper end (5a) of he mobile group (5). An air gap (8) is comprised, in a radial direction, between a coil (7) for activating the fixed group (6) and the upper end (5a) of the mobile group (5). The valve is constructionally simple and economical and has a higher fatigue resistance than known valves.

9 Claims, 2 Drawing Sheets

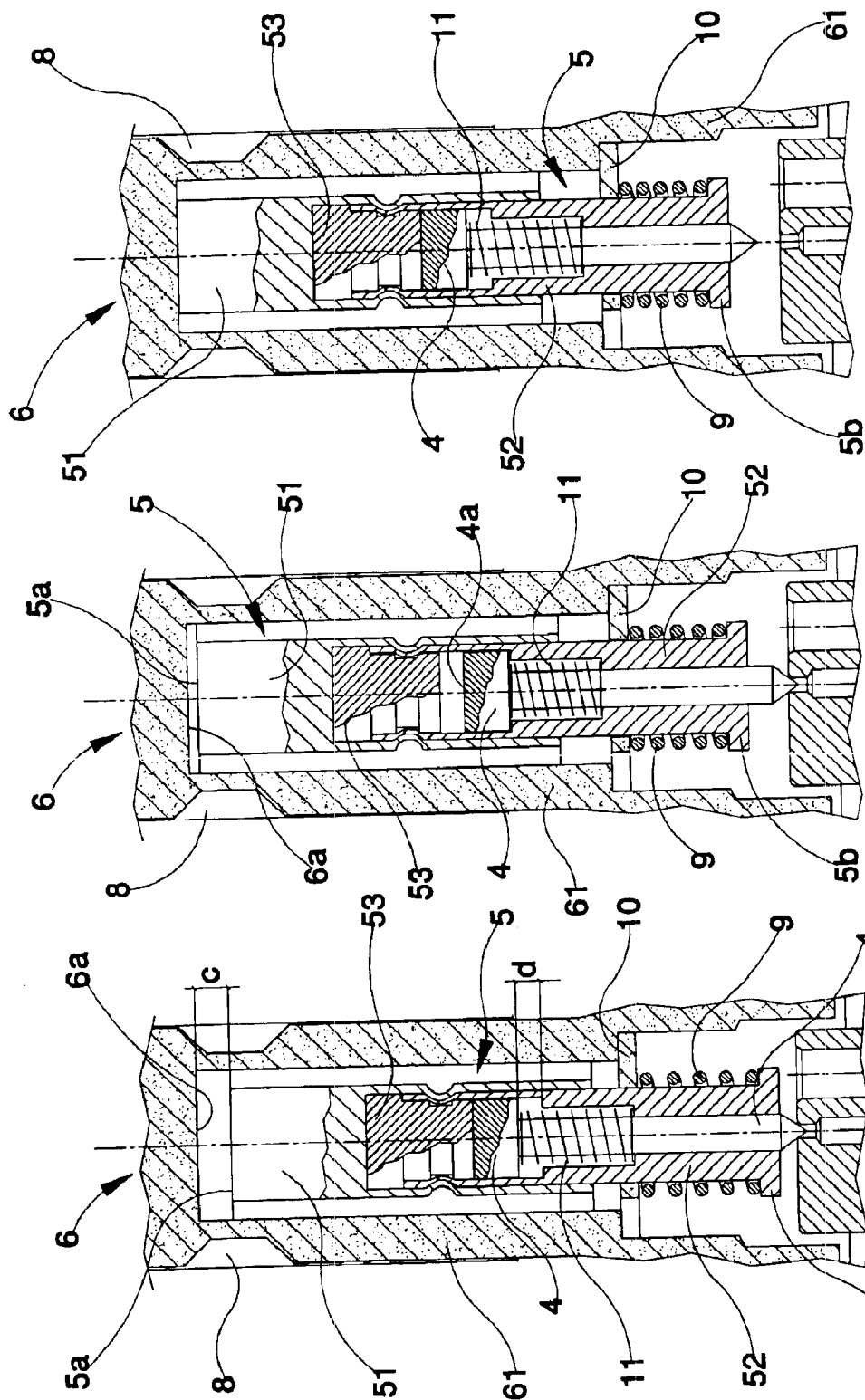

ELECTROMAGNETICALLY-ACTUATED TWO-WAY VALVE

TECHNICAL FIELD

The valve finds application in the field of electromagnetically-actuated valves for fluid passage.

BACKGROUND ART

Italian patent IT 1199046 shows a valve of the above-cited type, exhibiting a sleeve made of non-magnetic material which contains both the fixed group and the mobile group (both made of magnetic ferrous material). The non-magnetic sleeve, which is surrounded by an electromagnetic coil, is screwed at one end to the valve body and at its other end bears a locking ring nut. The normally-adopted solution, for avoiding the presence of a thread on the non-magnetic sleeve, is to weld at least one end of the sleeve to at least one element made of ferrous magnetic material.

Even this solution, however, does not eliminate drawbacks, among which the cost and time needed to do the actual welding and the resulting structural weakening in the welded zone.

U.S. Pat. No. 2,968,464 discloses an electromagnetically-actuated two-way valve as in the preamble of claim 1.

The main aim of the present invention is to provide a valve, constructionally simple and economical, which is able to obviate the above-mentioned drawbacks in the prior art.

An advantage of the valve is that it does not require the use of any elements made of non-magnetic materials.

A further advantage is that the invention makes available a valve lacking in welded zones and having a high mechanical resistance, especially to fatigue.

A further advantage of the invention is that the electromagnetic coil for actuating the valve can work with both direct and alternating current, without any modifications to the valve. In particular the coil can function in alternating current with no use of additional elements, such as for example brass washers and the like applied to the fixed group, as generally occurs in known valves.

A further advantage with respect to known valves is the reduction in the time necessary for opening and closing the valve itself.

These aims and advantages and more besides are all attained by the present invention, as it is characterised in the appended claims.

Further characteristics and advantages of the present invention will better emerge from the detailed description that follows of a preferred but non-exclusive embodiment of the invention, illustrated purely by way of a non-limiting example in the accompanying figures of the drawings, in which:

FIG. 2 is an enlarged-scale detail of figure one;

FIGS. 3 and 4 show the detail of FIG. 2 in two different operative configurations.

DISCLOSURE OF INVENTION

Figure 1:
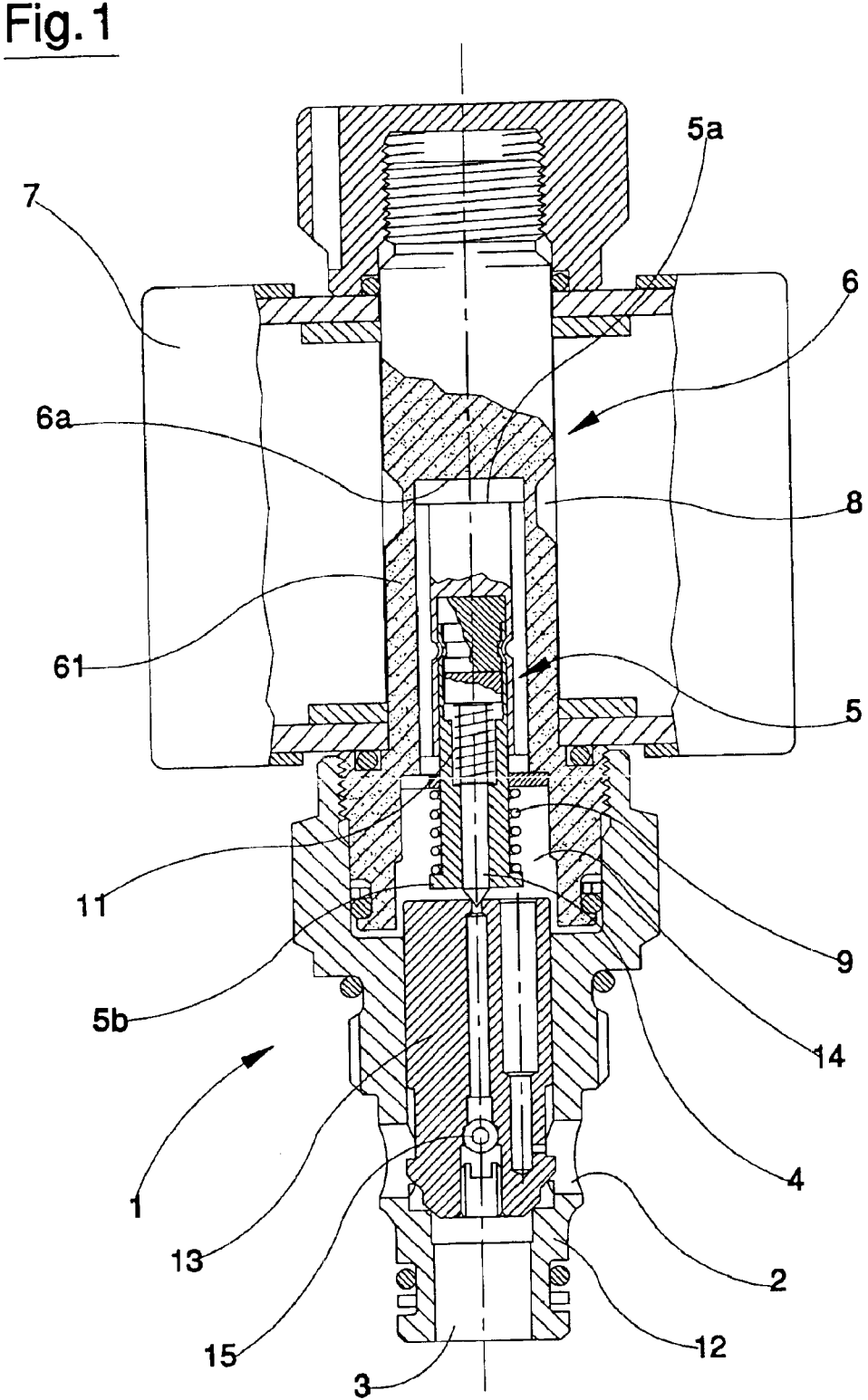
FIG. 1 is a partially-sectioned view of a valve made according to the invention.

With reference to the above-mentioned figures, 1 denotes in its entirety an electromagnetically-actuated valve. The valve is of the two-way, two-position type, normally closed, of the ON-OFF type. This type of valve is normally used for commanding the passage of a fluid, and is indirectly actuated by a pilot system. The invention may, however, also be applied to direct-action valves.

The valve 1 has a body 12 having an inlet 2 and an outlet 3 for the fluid. The valve body 12 has a seating on which a main obturator 13 acts, the obturator 13 being axially mobile and able to assume an open position and a closed position. Internally the obturator 13 has a first conduit which sets the inlet 2 in communication with a valve internal chamber 14, and a second conduit which places the chamber 14 in communication with the outlet 3. There is a non-return valve 15 on the second conduit to prevent backflow in the direction of the chamber 14.

The second conduit upwardly terminates in a seating on which a converging, conical or trunco-conical surface contactingly acts. The converging surface is made on an end of a second obturator 4 having a piloting function and being axially mobile with the possibility of assuming an open position (FIG. 4) and a closed position (Figures. from 1 to 3).

An axially mobile group 5, made of a ferrous magnetic material, includes the second obturator 4 which is axially mobile also in relation to the mobile group 5. A fixed group 6, which can be electromagnetically activated by a coil 7, is predisposed to attract the mobile group 5 towards itself. The coil 7 is wound externally about the fixed group 6 and the mobile group 5.

The mobile group 5 exhibits at an upper end 5a a flat upwards-facing surface (upwards and downwards refer to FIG. 1 and have no meaning in absolute terms). The upper end 5a faces a flat lower surface 6a, which is downwards-facing, of the fixed group 6. Both the flat surface of the upper end 5a and the flat surface 6a of the fixed group, destined to contact each other by effect of the excitation of the coil, are continuous and without recesses or seatings for other elements or any other interruptions in their flat surfaces.

When the fixed group 6 is deactivated (with the valve in the closed position), the upper end 5a is kept distant (at a predetermined distance "c" indicated in FIG. 2) from the lower surface 6a of the fixed group, while when the fixed group 6 is activated the mobile group 5 is attracted by the fixed group 6 until the upper end 5a of the mobile group moves to contact against the lower surface 6a of the fixed group 6. Distance "c" corresponds to the run of the mobile group 5 when attracted.

The space which, when the valve is not excited, is comprised between the upper end 5a of the mobile group 5 and the lower surface 6a of the fixed group 6 is not occupied by any solid element but only by the fluid inside the valve.

In the illustrated example, the mobile group 5 is made of three solidly-associated pieces: a first piece 51 having a full upper part, with no recesses, and a lower part which is tubular; a second piece 52, bush-shaped, with several diameter variations, which is internally inserted with a solid coupling to the lower tubular part of the first piece 51; a third piece 53 comprised between the second obturator 4 and the upper part of the first piece 51. The three pieces, 51, 52 and 53, are solidly associated one to another, for example by means of a coupling achieved by plastic deformation. With the valve closed, an upper end of the second obturator 4 exhibits a strike surface 4a (see FIG. 3) which strikes against a surface of the mobile group 5, which in the illustrated case is the lower surface of the third piece 53.

The mobile group 5 is contained internally of a tubular element, namely a sleeve 61, made of a ferrous magnetic material in a single piece with the fixed group 6. The lower part of the sleeve 61 and the upper part of the internal valve body defined a chamber 14, full of fluid, where the seating of the second obturator 4 is located.

The lower part of the mobile group 5 is situated internally of the chamber 14. The part of upper end of the valve body 12 contains the part of lower end of the sleeve 61 and is screwed to an external threaded surface of the sleeve 61.

As previously mentioned, the fixed group 6 and the sleeve 61 are formed in a single piece of ferrous magnetic material, which on an external lateral surface thereof exhibits an annular gulley situated at the same height as the upper end 5a of the mobile group. This gulley defines an air gap 8 with a predetermined axial length, which separates, in radial direction, the coil 7 from the piece 6 and 61 made of ferrous magnetic material which surrounds the mobile group 5. The annular gulley has inclined sides (for example an inclination of between 30° and 60° and preferably about 45°) so that the width of the air gap 8 gradually diminishes at the ends. The lower surface 6a of the fixed group, axially facing the mobile group 5, is located at the same height as an inclined side of the annular gulley 8, i.e. in a zone in which the width of the air gap 8 is variable. The upper end 5a of the mobile group 5, when the second obturator 4 is in the closed position and the valve is de-excited, is located at the height of the bottom of the gulley, where the width of the air gap 8 is at its greatest and is constant.

A return spring 9 displaces the mobile group 5 downwards. The return spring 9 is arranged externally of and coaxially to the part of the lower end of the mobile group 5 housed in the chamber. The lower end of the return spring 9 interacts contactingly against the upper surface of a shoulder located on the lower end of the mobile group 5 and, at an upper end thereof, against a striker exhibited on the sleeve 61. In the illustrated example, a striker ring 10 is located between the return spring 9 and the sleeve 61, which ring 10 is conformed in such a way as to let the fluid pass towards the upper internal part of the sleeve 61 and in particular towards the zone in which the mobile group 5 and the fixed group 6 face one another. The return spring 9 is arranged entirely below the upper end 5a of the mobile group 5. In other words the return spring 9 is entirely situated, with respect to the zone where the mobile group 5 and fixed group 6 are situated, behind the end 5a of the mobile group 5 which is axially facing the fixed group 6. In particular, the return spring 9 is completely external of the zone in which the mobile group 5 and the fixed group 6 are reciprocally facing in an axial direction; indeed, the return spring 9 is located at the end of the mobile group 5 which is opposite the end 5a which axially faces the fixed group 6.

An auxiliary spring 11 at the opening of the second obturator 4 is housed in an annular zone situated between the second obturator and a lateral internal surface of the mobile group 5. The auxiliary spring 11 is predisposed to lift the second obturator 4 with respect to the mobile group 5. It interacts contactingly between a striker surface internally of the mobile group 5 and a lower surface of a shoulder on the second obturator 4.

There is a predetermined axial distance d between the lower surface of the shoulder on the second obturator 4 and another striker surface internally of the mobile group 5 when the second obturator 4 is in the closed position. This distance d is slightly smaller (e.g. by about half a millimeter) with respect to the full run c of the mobile group.

The operation of the valve will now be described, starting from a situation in which the valve 1 is de-excited, the second obturator 4 is in the closed position (FIGS. 1 and 2) and the main obturator 13 is also closed. In this situation the second obturator 4 and the main obturator 13 are kept in the closed position by effect of the difference of pressure in the fluid between the inlet 2 and the outlet 3, i.e. upstream and downstream of the respective seatings of the two mobile elements, the second and the main obturators 4 and 13. The return spring 9 exerts an action, albeit a modest one, to close the second obturator 4 (and therefore also the main obturator 13), since it pushes the mobile group 5 downwards, the mobile group 5 also exhibiting a striker surface (situated on the third part 53) which interacts contactingly with the upper striker surface 4a of the second obturator 4. When the coil 7 is excited, the mobile group 5 begins its upwards axial run. In a first tract of the run, equal to "d" as described above, the second obturator 4 is stationary in the closed position. In FIG. 3 the mobile group is illustrated after having travelled the first tract of axial length "d" of its run. In this situation the action of closure of the second obturator 4, which is due to the difference of pressure of the fluid upstream and downstream of the seating of the second obturator 4, is greater than the auxiliary spring 11 resistance, which would tend to open the second obturator 4. In this initial stage of the run, the mobile group 5 is relatively distant from the fixed group 6 and thus the force of attraction exerted by the fixed group 6 is low but sufficient to displace the mobile group 5. Once the initial tract d of the run has occurred, the mobile group 5 interacts with the second obturator 4, thus beginning to draw it upwards. At the moment of contact (FIG. 3) the mobile group 5 has sufficient force to open the second obturator 4, both because it has acquired sufficient kinetic energy in the first tract of the run and because as it is axially closer to the fixed group 6 (distance "c" minus distance "d"), the attraction exerted by the fixed group 6 is more intense. In the final tract of the axial run of the mobile group 5, equal to c minus d, the second obturator 4 is opened and strikes against the fixed group 6. The opening of the second obturator 4 is aided and completed by the auxiliary spring 11 on opening, which lifts the second obturator 4 with respect to the mobile group 5. The opening of the second obturator 4 leads to the automatic opening of the main obturator 13 and thus the fluid passes between the inlet 2 and the outlet 3 through the seating of the main obturator 13.

The coil 7 remains active for the whole time the valve is kept open. To close the valve 1 it is sufficient to deactivate the coil 7. When this is done, there is no further attraction of the fixed group 6 and the return spring 9 lowers the mobile group 5, which draws the second obturator 4 and the main obturator 13 with it until the closed configuration of FIGS. 1 and 2 is achieved.

In a further embodiment, not illustrated, on valve opening the mobile group and the auxiliary spring, instead of operating on a mobile piloting element, can operate on a mobile element which opens or closes a seating provided for passage of the total head of fluid. A valve made as above could be, for example, a valve such as the one first illustrated, in which the obturator denoted by 13 is stationary and solidly associated to the valve body, rather than being mobile, and the function of the obturator (now only one) would be performed by the element denoted by 4, i.e. the second obturator.

In a further embodiment, in a valve such as the one illustrated in FIG. 1, a non-magnetic sleeve could be located between the mobile group and the coil, and the air gap could be eliminated. In this embodiment, the absence of recesses or hollow seatings (for example for the housing of springs or other elements) on the flat and parallel facing surfaces of the fixed group and mobile group, would enable the valve to deliver high performance under both direct and alternating current situations. Furthermore it has been seen that with respect to known valves, there is an increase in the force of attraction of the mobile group, with all other conditions remaining equal, such as the size of the fixed group and the activation potential of the coil.

What is claimed is:

1. An electromagnetically-actuated two-way valve, for commanding a passage of a fluid, which valve is normally closed and comprises:

a fixed group (6) which is electromagnetically actuated;

a mobile group (5) which in an axial direction exhibits an upper end (5*a*) which faces the fixed group (6) and is attracted thereby;

an obturator (4) which is axially mobile between an open position and a closed position of a seating which seating is used for the passage of the fluid; when in the closed position the obturator (4) being intercepted and drawn by the mobile group (5) in an opening movement, when the mobile group (5) is at a short distance from an end of a run towards the fixed group (6), the run being induced by force of electromagnetic attraction;

a return spring (9) predisposed to displace the obturator (4) towards the closed position when the fixed group (6) is deactivated;

wherein the return spring (9) is entirely situated behind the upper end (5*a*) of the mobile group (5), which faces the fixed group (6).

2. The valve of claim 1, comprising an electro magnetic coil (7) which is located externally of the fixed group (6) and the mobile group (5) and which is used to activate the fixed group (6), and wherein in a radial direction between the coil (7) and the upper end (5*a*) of the mobile group (5) there is an air gap (8).

3. The valve of claim 2, wherein the upper end (5*a*) of the mobile group (5) is arranged at a height equivalent to a tract of greatest depth of the air gap (8) when the valve is in the closed position.

4. The valve of claim 2, wherein the air gap (8) is made in an external lateral surface of a sleeve (61) comprised between the coil (7) and the mobile group (5), realized in a single body with the fixed group (6).

5. The valve of claim 2, wherein the air gap (8) has an end zone, situated at a height equal to a lower surface (6*a*) of the fixed group (6) and perpendicular to an axis thereof, and facing the upper end (5*a*) of the mobile group (5), a depth of which gradually decreases.

6. The valve of claim 1, wherein the return spring (9) is arranged around the mobile group (5) in contact with a shoulder (5*b*) which projects radially from a second end of the mobile group (5) which is axially opposite to he upper end (5*a*).

7. The valve of claim 3, wherein the air gap (8) is made in an external lateral surface of a sleeve (61) comprised between the coil (7) and the mobile group (5), realized in a single body with the fixed group (6).

8. The valve of claim 3, wherein the air gap (8) has an end zone, situated at a height equal to a lower surface (6*a*) of the fixed group (6) and perpendicular to an axis thereof, and facing the upper end (5*a*) of the mobile group (5), a depth of which gradually decreases.

9. The valve of claim 4, wherein the air gap (8) has an end zone, situated at a height equal to a lower surface (6*a*) of the fixed group (6) and perpendicular to an axis thereof, and facing the upper end (5*a*) of the mobile group (5), a depth of which gradually decreases.

* * * * *